017
United States Patent [19]

Plueddemann

[11] 3,955,036
[45] May 4, 1976

[54] PRIMER COMPOSITIONS

[75] Inventor: Edwin P. Plueddemann, Midland, Mich.

[73] Assignee: Dow Corning Corporation, Midland, Mich.

[22] Filed: Nov. 19, 1973

[21] Appl. No.: 417,017

Related U.S. Application Data

[62] Division of Ser. No. 216,769, Jan. 10, 1972, Pat. No. 3,808,018.

[52] U.S. Cl. ............... 428/429; 260/824 R; 260/826; 260/827; 428/411; 428/421; 428/436; 428/440; 428/441; 428/447; 428/442; 428/460; 428/461; 428/462; 428/463; 428/413; 428/497; 428/506; 428/517; 428/518; 428/519; 428/520; 428/521; 428/522; 428/523

[51] Int. Cl.[2] ............... B32B 15/08; B32B 17/10; B32B 25/08

[58] Field of Search ......... 117/124 D, 124 F, 124 E, 117/91, 72; 260/448.2 N; 156/326; 106/218, 236, 237; 428/429, 447, 411, 436, 440, 441, 442, 460, 461, 462, 463, 413, 421, 497, 506, 517, 518, 519, 520, 521, 522, 523

[56] References Cited
UNITED STATES PATENTS

| 2,715,133 | 8/1955 | Speier | 260/448.2 N |
|---|---|---|---|
| 2,721,873 | 10/1955 | MacKenzie | 260/17.4 R |
| 2,804,439 | 8/1957 | Drechsel | 260/46.5 UA |
| 3,066,060 | 11/1962 | Gross | 428/460 |
| 3,308,008 | 3/1967 | Ronay | 428/460 |
| 3,317,577 | 5/1967 | Ryan | 260/448.8 R |
| 3,545,991 | 12/1970 | Body | 106/218 |
| 3,554,952 | 1/1971 | Plueddemann | 260/448.8 R |
| 3,560,543 | 2/1971 | Plueddemann | 260/448.8 R |
| 3,652,380 | 3/1972 | Strack | 260/42.47 |

OTHER PUBLICATIONS

Chemical Abstracts, 61:13107g, (1964).

*Primary Examiner*—Ronald H. Smith
*Assistant Examiner*—William H. Schmidt
*Attorney, Agent, or Firm*—Norman E. Lewis

[57] ABSTRACT

Adhesion of thermoplastic elastomers, such as unvulcanized styrene-butadiene rubber, to a solid substrate is obtained by using a primer containing a tackifier component, such as hydrogenated rosin or a coumarone-indene resin, and an amino-functional trihydrolyzable silane, partial condensates and hydrochloride salts thereof in which the amino-functionality is in the form of a primary or secondary amine.

7 Claims, No Drawings

PRIMER COMPOSITIONS

CROSS REFERENCES TO RELATED APPLICATIONS

This is a division of application Ser. No. 216,769, filed Jan. 10, 1972, now U.S. Pat. No. 3,808,018.

BACKGROUND OF THE INVENTION

The present invention relates to improved primer compositions. in one aspect, the invention relates to articles incorporating an unvulcanized elastomer adhered to a solid substrate.

Organofunctional silanes have been suggested as primers to improve the adhesion of elastomers and sealants to solid substrates. The bonds obtained by the use of such silane primers are not completely water resistant. The silane may be irreversibly bonded to the rubbery polymer through the organofunctional substituent, but the bonding to the substrate is through hydrolyzable substituents. Hydrolysis with hydrophilic substrates is reversible. As individual bonds are hydrolyzed, the polymer segments pull away from the interface and the silanol functionality is no longer available for reformation of chemical bonds with the substrate. Hydrolysis thus becomes irreversible and additional bonds are hydrolyzed until there is complete loss of adhesion.

The present invention provides water resistant bonding of rubbery polymers to hydrophilic solid substrates by use of a primer composition containing a tackifier resin and a silane having specific amine functionality. The primer is partially compatible with the elastomer, forms a hard but flexible film at the interface and provides chemical bonding to the substrate by means of relatively immobile silanol functionality. Although silanes have been used alone as primers or in combination with hot melt adhesive as described in the German Offenlegungsschrift 2,029,703, the concept of the above-described primer is believed to be novel.

Thus, it is an object of the present invention to provide an improved primer composition.

It is another object of the invention to provide a composite article having a rubbery polymer bonded to a solid substrate.

These and other objects of the present invention will be apparent to one skilled in the art upon consideration of the following disclosure and appended claims.

In accordance with the invention there is provided a priming composition comprising (a) 80 to 99.99 weight percent of a tackifier component consisting essentially of resin having a molecular weight of no more than 12,000, said resin being selected from the group consisting of natural or modified rosin, esters of natural or modified rosin, polyterpenes, coumaroneindene resins and modified coumarone-indene resins, polycyclopentadiene, aliphatic hydrocarbon resins and chlorinated aliphatic hydrocarbon resins, asphaltic resins, polystyrene and copolymers of styrene with at least one ethylenically unsaturated aromatic monomer, phenolic and modified phenolic resins and chlorinated terphenyl or diphenyl resins having a chlorine content of about 42 to 65 weight percent; and (b) 0.01 to 20 weight percent of an organosilicon compound of the general formula

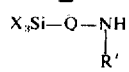

partial condensates thereof and hydrochloride salts thereof in which X is the hydroxyl group or a hydrolyzable radical; Q is a divalent hydrocarbon radical or a substituted divalent hydrocarbon radical containing nitrogen in the form of —NR groups wherein R is a hydrogen atom, a lower alkyl group containing from 1 to 6 inclusive carbon atoms, or a phenyl radical; and R' is selected from the group consisting of the hydrogen atom, monovalent hydrocarbon radicals containing from 1 to 18 inclusive carbon atoms and oxygen-substituted monovalent hydrocarbon radicals containing from 1 to 18 carbon atoms.

The tackifier components present in the above-described composition are well-known materials and are commercially available from a number of sources. Rosin, of course, is a component of the resinous exudation of various types of pine trees and consists essentially of abietic and similar type acids. Rosin is modified by hydrogenation to decrease the amount of unsaturation; by disproportionation to increase the dehydroabietic acid content; by polymerization to obtain a dimeric mixture and by reaction with fumaric acid or maleic anhydride. Both natural and modified rosin can be esterified by reaction with glycerol, pentaerythritol glycols and other polyols. The readily available modified and esterified rosins include pentaerythritol ester of hydrogenated rosin, epoxidized pine gum, dichlorocarbene adducts of rosin ester, oxonated rosin, rosin-formaldehyde adducts, disproportionated rosin-propylene glycol ester, diethylene glycol ester of beta-propiolactone-modified gum rosin, diethylene glycol ester of beta-propiolactone-modified gum rosin and maleic anhydride, alkyl diester of rosin and the beta-hydroxy alkyl ester of rosin.

Polyterpenes form another class of tackifiers. These materials are formed by the catalytic polymerization of alpha and beta-pinenes which occur in turpentine and are considered as low molecular weight polymers of isoprene ($C_5H_8$). The polymers can be linear or cyclic and generally have a molecular weight of less than 2,000. Coumarone and indene occur in the solvent naptha cuts of coal-tar distillates and are conveniently copolymerized in the presence of sulfuric acid to obtain coumarone-indene resins. Because of the residual unsaturation in these low molecular weight polymers, the materials can be reacted with aldehydes to provide fulvene-modification of the resin. The coumerone-indene polymers can also be hydrogenated, reacted with phenols on reacted with dicyclopentadiene. Cyclopentadiene, like coumarone and indene, is found in coal-tar and polymerizes at temperatures above 200°C. to form a low molecular weight (500 to 600 ) resin.

Other suitable tackifiers include aliphatic hydrocarbon resins and resins derived from chlorinated hydrocarbon resins. These hydrocarbon and chlorohydrocarbon resins are relatively low molecular weight polymers derived from olefins and diolefins having 3 to 5 inclusive carbon atoms, such as n-butene and isobutylene. Exemplary are polybutenes having molecular weights in the range of 300 to 1500 and polyisobutylenes having molecular weights in the range of 8,000 to 12,000. Also suitable are styrene homopolymers and styrene copolymers containing at least one ethylenically unsaturated monomer, such as vinyl toluene and alpha-methylstyrene. These hydrocarbon tackifier resins; aliphatic and aromatic, generally have a ring and ball softening temperature of from about 50°to 120°C. Phenolic tackifiers include the phenol-formaldehyde novolac products, substituted products, such as p-alkylphenol novolac; phenol-furfural reaction products, p-tert-butylphenol-acetylene resins and phenoplasts based on the reaction of formaldehyde with substituted phenols such as p-cresol, p-tert-amyl phenol, p-phenylphenol and Bisphenol-A. The chlorinated terphenyl and diphenyl polymers useful as tackifiers have a chlorine content of from 42 to 65 weight percent and are yellow clear resins.

The above-described tackifiers are blended with amino-functional silanes in which the amine-function contains an active hydrogen. These silanes are of the general formula $$X_3Si-Q-NH$$
$$\quad\quad\quad\quad |$$
$$\quad\quad\quad\quad R'$$

in which X, Q and R' are as defined above. The hydrolyzable radicals in the definition of X include halogen atoms, for example, F, Cl, Br or I; groups of the formula —OZ when Z is any hydrocarbon or halogenated hydrocarbon group such as methyl, ethyl, isopropyl, octadecyl, allyl, hexenyl, cyclohexyl, phenyl, benzyl, betaphenylethyl, 2-chloroethyl, chlorophenyl, 3,3,3-trifluoropropyl or bromocyclohexyl; any hydrocarbon ether radical such as 2-methoxyethyl, 2-ethoxyisopropyl, 2-butoxyisobutyl, p-methoxyphenyl or —(CH$_2$CH$_2$O)$_2$CH$_3$, any acyl radical such as acetyl, propionyl, benzoyl, cyclohexoyl, acrylyl, methacrylyl, stearyl, naphthoyl, trifluoroacetyl, chlorobenzoyl or bromopropionyl; or any N,N-amino radical such as dimethylamino, diethylamino, ethylmethylamino, diphenylamino, or dicyclohexylamino. X can also be any amino radical such as NH$_2$, dimethylamino, diethylamino, methylphenylamino or dicylcohexylamino; any ketoxime radical of the formula —ON=CM$_2$ or —ON=CM' in which M is any monovalent hydrocarbon or halogenated hydrocarbon radical such as those shown for Z above and M' in any divalent hydrocarbon radical both valences of which are attached to the carbon, such as hexylene, pentylene or octylene; ureido groups of the formula —N(M)CONM''$_2$ in which M is defined above and M'' is H or any of the M radicals; carbamate groups of the formula —OOCNMM'' in which M and M'' are defined above, or carboxylic amide radicals of the formula —NMC=O(M'') in which M and M'' are defined above. X can also be the sulfate group or sulfate ester groups of the formula —OSO$_2$(OM) where M is defined above; the cyano group; the isocyanate group; and the phosphate group or phosphate ester groups of the formula —OPO(OM)$_2$ in which M is defined above.

The term "hydrolyzable group" means any group attached to the silicon which is hydrolyzed by water at room temperature to form silanols. Alkoxy radicals containing no more than four carbon atoms are the preferred hydrolyzable groups.

Q can be a divalent hydrocarbon radical or a divalent hydrocarbon radical containing one or more —N(R)— groups wherein R is a hydrogen atom, a lower alkyl radical containing from 1 to 6 inclusive carbon atoms or a phenyl radical. Specific examples of such divalent hydrocarbon radicals include, propylene, the +CH$_2$+$_6$ radical, the +CH$_2$+$_{10}$ radical, the +CH$_2$+$_{13}$ radical and branched chain radicals such as

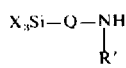

The nitrogen-containing Q radicals are exemplified by +CH$_2$+$_3$NHCH$_2$CH$_2$—,

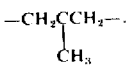

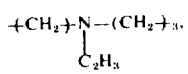

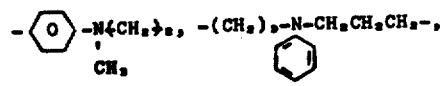

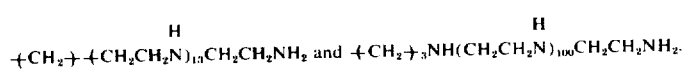

It is preferred that the divalent Q radical be free of aliphatic unsaturation and contain no more than 18 carbon atoms.

In addition to the hydrogen atom, R' can be any monovalent hydrocarbon radical containing from 1 to 18 inclusive carbon atoms, such as alkyl radicals, such as methyl, ethyl, isopropyl, hexyl, octadecyl or myricyl; alkenyl radicals such as vinyl, allyl, hexenyl; alkynyl radicals such as propargyl; cycloaliphatic radicals such as cyclopentyl, cyclohexyl or cyclohexenyl; aromatic hydrocarbon radicals such as phenyl, tolyl, xylyl, xenyl, naphthyl or anthracyl and aralkyl hydrocarbon radicals such as benzyl, beta-phenylethyl, beta-phenylpropyl or gamma-tolylpropyl.

R' can also be a substituted monovalent hydrocarbon radical containing oxygen in the form of —COC— or

for example,

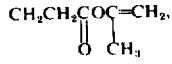

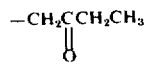

and the like.

Thus, the silanes useful in the present invention include

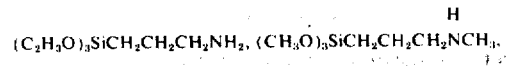

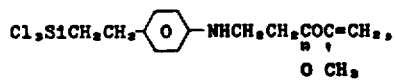

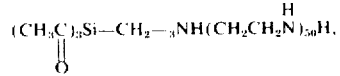

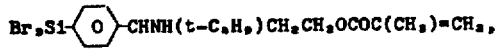

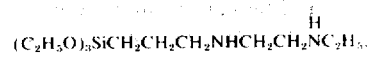

and the like. Partial condensates of the silanes or their salts can also be utilized. "Partial condensate" is meant to imply that a detectable amount of hydroxyl or hydrolyzable groups remain uncondensed in the composition, preferably at least one such group per every four silicon atoms remains uncondensed. The partial condensate is a water-soluble polymer of —SiOSi— units with the silicon avoms retaining their amine-functionality, the hydroxyl or hydrolyzable groups being available for bonding with the substrate.

These primer compositions can be prepared by cold blending the silane with the tackifier component in a mutual solvent. The silane is present in an amount in the range of from 0.01 to 20 percent by weight, based on the weight of primer composition excluding solvent. The optimum silane content will vary with the type of tackifier used and the elastomer to which it is applied. For ease of application to solid substrates, it is preferred to include a solvent, such as xylene or chloroform, in the primer composition.

The above-described primer compositions are utilized to increase the adhesion of rubbery polymers to solid substrates. The rubbery polymers or unvulcanized thermoplastic elastomers are linear polymers, of natural or synthetic origin, having a glass transition temperature (Tg) of less than 0°C. and a molecular weight of at least 20,000. Exemplary of such thermoplastic elastomers are unvulcanized natural rubber, chlorinated natural rubber, styrene-butadiene rubber, polyisoprene, butadiene polymers, polybutene, isobutylene-isoprene copolymers, ethylene-propylene copolymers and terpolymers, chlorinated butylene-isoprene polymers, chlorosulfonated polyethylene, polychloroprene, polyacrylates, polymethacrylates, polyurethanes, acrylonitrile-butadiene rubbers, hexafluoropropylenevinylidene fluoride rubbery copolymers, epichlorohydrin homopolymers, and epichlorohydrin-propylene oxide rubbery copolymers. These rubbery polymers often contain fillers, such as silica and additives, for example, pigments, plasticizers and stabilizers.

The primer composition used in conjunction with a particular thermoplastic elastomer is chosen to be partially compatible, but not completely compatible, with the elastomer. This partial compatibility results in migration of the primer into the rubber to provide adhesion. Of course, complete compatibility or solubility of the primer in the rubber would result in removal of the primer from the bond interface and subsequent loss of adhesion. Vulcanization or complete crosslinking of the elastomer prior to or after contact with the primer reduces compatibility and results in poor adhesion. Thus, the primer composition must be "matched" with the elastomer. This matching or determination of compatibility characteristics can be accomplished by conventional adhesion tests known in the art. The examples illustrate the matching of the primer compositions to the elastomer.

The primer compositions of the invention are coated onto the surface of the solid substrate to which bonding of the elastomer is contemplated. The primer coating can be applied by conventional methods, such as dipping, spraying, brushing and the like. If the primer is used as a very dilute solution, provision for drying of the coating and removal of at least a portion of the solvent should be made.

The solid substrates to which rubbery polymers are commonly bonded include wood, metal, glass, ceramics, masonry, stone and plastics, both thermoplastic and thermosetting, such as epoxy resins, polycarbonate and polymethylmethacrylate. A common use of the rubbery polymers, such as butyl rubber, is as sealant between different substrates, such as between metal and glass as exemplified by automobile windshields. The use of the primer compositions of the invention greatly enhances the adhesion of such sealants.

The following examples are illustrative of the invention delineated in the claims.

EXAMPLE 1

Several primer compositions were prepared by cold blending 100 parts by weight of 50 percent solutions of various tackifiers in xylene with 5 parts by weight of N-beta-aminoethyl, gamma-aminopropyl trimethoxysilane. Glass microscope slides were coated with the different primer compositions and allowed to air dry. The primed glass slides were pressed against heated styrene-butadiene-styrene block copolymers having a molecular weight in the range of from about 70,000 to 100,000 (commercially available from the Shell Oil Company under the designation "Kraton 1102") for one minute at 150°c. Adhesion of the thermoplastic elastomer to the glass was determined after cooling to room temperature. Adhesion was rated on a scale of 1 to 4 with a rating of "1" indicating that the elastomer was easily stripped from the glass; "2" indicating that the adhesion was better than on unprimed glass but that the elastomer could be stripped from the glass without tearing; "3" indicating that the elastomer could be stripped from the glass with a strong steady pull and that there was occasional tearing of the elastomer; and "4" indicating cohesive failure of the elastomer during attempts to peel. If initial adhesion was good, a duplicate sample was soaked in water for three days and adhesion was again determined.

The tackifier component utilized in the primer compositions and adhesion ratings are set forth below:

| Tackifier Present In The Primer Composition Containing ~10 wt. % $H_2NCH_2CH_2NH(CH_2)_3Si(OCH_3)_3$ | Adhesion Of Elastomer To Glass | |
|---|---|---|
| | Dry At Room Temperature | After 3 Days Water Immersion |
| none (silane alone) | 2 | 1 |
| alpha-pinene polymer | 3 | 3 |
| poly(cyclopentadiene) | 3 | 3 |
| terpene copolymer | 3 | 2 |
| terpene-modified phenolic | 4 | 4 |
| vinyltoluene-α-methylstyrene copolymer | 4 | 2–3 |
| aromatic hydrocarbon polymer (coal tar derivative) | 3 | 3 |
| hydrogenated rosin | 4 | 2 |
| glycerine ester of hydrogenated rosin | 4 | 4 |
| *coumarone-indene copolymer | 2 | 1 |
| *chlorinated polyolefin | 2 | 1 |
| *methyl abietate | 2 | 1 |
| *reactive phenolic resin | 1 | — |
| *hydrogenated methyl ester of rosin | 2 | 1 |

*These primer compositions were either incompatible or completely compatible with the styrene-butadiene-styrene block copolymer.

This example demonstrates the simple screening test utilized in determining partial compatibility of the primer composition in a particular elastomer. It is to be noted that the silane alone is not an effective adhesion promoter. The data for primers utilizing terpene-modified phenolics and the glycerine ester of hydrogenated rosin shows that optimum adhesion can be retained under wet condition for long periods of time.

EXAMPLE 2

Primer compositions containing various types of silanes were prepared by cold blending the silanes with one of two types of tackifier to obtain a primer containing about 10 weight percent silane (based on the total weight of silane and tackifier) as a 50 weight percent solution in xylene. Utilizing the elastomer and testing procedure described in Example 1, the effectiveness of various silanes was determined. Results are given below.

| Silane Component Of Primer Composition | Adhesion Of Elastomer To Glass (Dry At Room Temperature) | |
|---|---|---|
| | With Vinyltoluene-α-Methylstyrene Copolymer As Tackifier Component | With Terpene-Modified Phenol Novolac Resin As Tackifier Component |
| no silane | 1 | 1 |
| $CH_2=C-COO(CH_2)_3Si(OCH_3)_3$<br>     \|<br>     $CH_3$ | 1 | 1 |
| $CH_2-C-COO(CH_2)_2N^+(CH_2)_3Si(OCH_3)_3 \cdot Cl^-$<br>     \|        \|<br>     $CH_3$    $(CH_3)_2$ | 1 | 1 |
| $CH_2=CHSi(OCH_3)_3$ | 1 | 1 |
| $CH_2-CH-CH_2O(CH_2)_3Si(OCH_3)_3$<br>\\_O_/ | 1 | 1 |
| $HS(CH_2)_3Si(OCH_3)_3$ | 1 | 1 |
| $ClCH_2CH_2CH_2Si(OCH_3)_3$ | 1 | 1 |
| $ClCH_2-\langle O \rangle-CH_2CH_2Si(OCH_3)_3$ | 1 | 1 |
| $CH_2=CH-\langle O \rangle-CH_2CH_2Si(OCH_3)_3$ | 1 | 1 |
| $ICH_2CH_2CH_2Si(OCH_3)_3$ | 1 | 1 |
| $Br_2C_6H_3Si(OCH_3)_3$ | 1 | 1 |
| $CH_3O-\langle O \rangle-(CH_2)_3Si(OCH_3)_3$<br>     OH | 1 | 1 |
| $(CH_3)_2N(CH_2)_3Si(OCH_3)_3$ | 1 | 1 |
| $CH_3NH(CH_2)_3Si(OCH_3)_3$ | 3 | 3 |
| $NH_2(CH_2)_3Si(OC_2H_5)_3$ | 4 | 4 |
| $H(NCH_2CH_2)_{2k}N(CH_2)_3Si(OCH_3)_3$<br>     H        H | 4 | 4 |
| $\langle O \rangle-CH_2NHCH_2CH_2NH(CH_2)_3Si(OCH_3)_3 \cdot HCl$ | 4 | 4 |
| $CH_2=CH-\langle O \rangle-CH_2NHCH_2CH_2NH(CH_2)_3Si(OCH_3)_3 \cdot HCl$ | 4 | 4 |

These data demonstrate that only the silanes (and their hydrochloride salts) which have primary or secondary amine functionality are effective in the primer compositions of the invention.

EXAMPLE 3

Primer compositions were formulated containing terpenemodified phenol novolac as the tackifier and β-aminoethyl, gamma-aminopropyltriethoxysilane as the silane. The amount of silane in the primer composition was varied from 0.01 to 10 parts by weight per 100 parts of tackifier. The primer compositions were applied to glass slides from a xylene solution. Several different types of thermoplastic elastomers were bonded to the primed glass by pressing for one minute at 150°C. Adhesion was determined by the previously described method except that wet adhesion was determined after one day in water. As shown below each elastomer required a unique optimum level of silane in the primer composition.

EXAMPLE 4

The primer composition containing 10 parts by weight of silane as described in Example 3 was applied from a 50 percent xylene solution to a variety of substrates. Adhesion of a styrene-butadiene-styrene block copolymer to the primed substrates was determined. For comparison, adhesion to the unprimed substrate was also determined. Results are given below:

| | Adhesion Of Elastomer To Substrate | | | |
|---|---|---|---|---|
| | Unprimed | | Primed | |
| Substrate | Dry | Wet (3 days) | Dry | Wet (3 days) |
| Glass | 1 | — | 4 | 2 |
| Ceramic Tile | 2 | 1 | 4 | 4 |
| Aluminum | 2 | 2 | 4 | 4 |
| Magnesium | 2 | 1 | 3 | 2–3 |
| Titanium | 1 | — | 3 | 2–3 |
| Brass | 1 | — | 4 | 4 |
| Tin-coated Steel | 2 | 1 | 4 | 4 |
| Stainless Steel | 1 | — | 3 | 3 |
| Cold-rolled Steel | 1 | — | 3 | 3 |
| Marble | 1 | — | 2–3 | — |
| Red Cedar | 1 | — | 2–3 | — |
| Epoxy Resin On Aluminum | 1 | — | 3 | 2 |

| | Adhesion of Elastomer to Glass | | | | | | | | | |
|---|---|---|---|---|---|---|---|---|---|---|
| Parts Silane Added Per 100 Parts Of Tackifier | Styrene-Butadiene Styrene Block Copolymer | | Styrene-Butadiene Rubber | | Butyl Rubber | | Isoprene Rubber | | Ethylene-Propylene Terpolymer | |
| | Dry | Wet | Dry | Wet | Dry | Wet | Dry | Wet | Dry | Wet |
| 0 | 1 | — | 1 | — | 1 | — | 1 | — | 1 | — |
| 0.01 | 2 | 1 | 4 | 4 | 1 | — | 1 | — | 1 | — |
| 0.05 | 4 | 2 | 4 | 4 | 1 | — | 1 | — | 1 | — |
| 0.1 | 4 | 4 | 4 | 4 | 2 | — | 2 | 2 | 1 | — |
| 0.5 | 4 | 4 | 4 | 4 | 2 | — | 4 | 2 | 1 | — |
| 1.0 | 4 | 4 | 4 | 4 | 2 | 2 | 3 | 2 | 1 | — |
| 2.0 | 4 | 4 | 4 | 4 | 4 | 4 | 4 | 4 | 2 | 2 |
| 5.0 | 4 | 4 | 2 | 1 | 4 | 3 | 4 | 3 | 4 | 2 |
| 10.0 | 4 | 2 | 1 | — | 4 | 3 | 4 | 2 | 4 | 4 |

These data demonstrate that, for certain elastomers, such as styrene-butadiene rubber, only very small amounts of silane (in combination with the specified tackifier) are needed to obtain optimum adhesion while adhesion of other elastomers, such as ethylene-propylene terpolymers, requires much greater amounts of the silane when the same tackifier is utilized. It is evident that the amount of silane present in the primer composition is a factor affecting compatibility with the elastomers.

These data show that use of the primer compositions of the invention gives a significant increase in the adhesion of thermoplastic elastomers to a variety of surfaces.

EXAMPLE 5

Mixtures containing 10 weight percent of β-aminoethyl, gamma-aminopropyltrimethoxysilane and containing different tackifier resins were applied to glass slides from xylene solution. Various thermoplastic rubbery polymers were adhered to the primed glass and the degree of adhesion was determined. The following primer compositions were found to give good to very good (rating of 3–4) with the designated elastomers:

| Elastomer | Primer Composition |
|---|---|
| isoprene | glycerine ester of hydrogenated rosin plus aminosilane and polyterpene plus aminosilane |
| chloroprene | glycerine ester of hydrogenated rosin plus aminosilane |
| styrene-butadiene | polyterpene plus aminosilane |
| chloro-butylene-isoprene | glycerine ester of hydrogenated rosin plus aminosilane gives "fair" adhesion |
| styrene-isoprene-styrene block copolymer | terpene-modified phenolic novolac plus aminosilane |
| ethylene-propylene terpolymer | polyterpene plus aminosilane |
| chlorosulfonated polyethylene | vinyltoluene-alpha-methylstyrene copolymer plus aminosilane |
| acrylic | vinyltoluene-alpha-methylstyrene copolymer plus aminosilane |
| epichlorohydrin homopolymer | terpene-modified phenolic novolac plus aminosilane |
| epichlorohydrin-ethylene oxide copolymer | terpene-modified phenolic novolac plus aminosilane and vinyltoluene-alpha-methylstyrene copolymer plus aminosilane |

| Elastomer | Primer Composition |
|---|---|
| hexafluoropropylene-vinylidene fluoride copolymer | glycerine ester of hydrogenated rosin plus aminosilane |

This list is representative of primer compositions matched to thermoplastic elastomers to obtain adhesion.

Reasonable modification and variation are within the scope of the invention which is directed to novel primer compositions and the use of such primers in the bonding of thermoplastic elastomers.

That which is claimed is:

1. An article of manufacture comprising a solid substrate having on the surface thereof a coating of a primer composition consisting essentially of
   a. 80 to 99.99 weight percent of a tackifier component consisting essentially of resin having a molecular weight of no more than 12,000, said resin being selected from the group consisting of natural or modified rosin, esters of natural or modified rosin, polyterpenes, coumaroneindene resins and modified coumarone-indene resins, polycyclopentadiene, aliphatic hydrocarbon resins and chlorinated aliphatic hydrocarbon resins, polystyrene and copolymers of styrene with at least one ethylenically unsaturated aromatic monomer, phenolic and modified phenolic resins and chlorinated terphenyl or diphenyl resins having a chlorine content of about 42 to 64 weight percent; and
   b. 0.01 to 10 weight percent of an organosilicon compound of the general formula

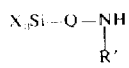

partial condensates thereof and hydrochloride salts thereof in which
   X is the hydroxyl group or a hydrolyzable radical;
   Q is a divalent hydrocarbon radical or a substituted divalent hydrocarbon radical containing nitrogen in the form of one or more

groups wherein R is a hydrogen atom, a lower alkyl group containing from 1 to 6 inclusive carbon atoms or the phenyl radical; and R' is selected from the group consisting of the hydrogen atom, monovalent hydrocarbon radicals containing from 1 to 18 inclusive carbon atoms and substituted monovalent hydrocarbon radicals containing from 1 to 18 inclusive carbon atoms, and, in contact with said coating of primer composition, an unvulcanized thermoplastic elastomer consisting essentially of a liner polymer having a glass transition temperature (Tg) of less than 0°C. and a molecular weight of at least 20,000, said primer composition being partially, but not completely, compatible with said unvulcanized elastomer.

2. An article in accordance with claim 1 wherein the solid substrate is glass.

3. An article of manufacture in accordance with claim 1 wherein the solid substrate is metal.

4. An article in accordance with claim 1 wherein the unvulcanized thermoplastic elastomer is selected from the group consisting of polyisoprene, polychloroprene, styrene-butadiene copolymers, chloroisobutylene-isoprene copolymers, styrene-butadiene-styrene block copolymers, styrene-isoprene-styrene block copolymers, ethylene-propylene terpolymers, chlorosulfonated polyethylene, epichlorohydrin homopolymers, epichlorohydrin-ethylene oxide copolymers and hexafluoropropylene-vinylidene fluoride copolymers.

5. An article in accordance with claim 1 wherein the primer composition contains a silane (b) selected from the group consisting of $X_3SiCH_2CH_2CH_2NH_2$ and $X_3Si+CH_2+_3NHCH_2CH_2NH_2$ in which X is an alkoxy radical containing from 1 to 4 inclusive carbon atoms.

6. An article in accordance with claim 5 wherein the primer composition contains a tackifier component (a) selected from the group consisting of esters of modified rosin, polyterpene, modified phenolic resins and copolymers of styrene with at least one ethylenically unsaturated monomer.

7. An article in accordance with claim 1 wherein the primer composition contains a silane (b) of the formula

in which X is an alkoxy radical containing from 1 to 4 inclusive carbon atoms.

* * * * *